United States Patent
Mahy

(10) Patent No.: US 7,229,146 B2
(45) Date of Patent: Jun. 12, 2007

(54) SYSTEM AND METHOD FOR CHARACTERIZING A PRINTING DEVICE

(75) Inventor: Marc Mahy, Wilsele (BE)

(73) Assignee: Agfa Graphics NV, Mortsel (BE)

( * ) Notice: Subject to any disclaimer, the term of this patent is extended or adjusted under 35 U.S.C. 154(b) by 135 days.

(21) Appl. No.: 10/510,870

(22) PCT Filed: Apr. 4, 2003

(86) PCT No.: PCT/EP03/50090

§ 371 (c)(1),
(2), (4) Date: Jul. 25, 2005

(87) PCT Pub. No.: WO03/085955

PCT Pub. Date: Oct. 16, 2003

(65) Prior Publication Data

US 2006/0164502 A1    Jul. 27, 2006

Related U.S. Application Data

(60) Provisional application No. 60/373,526, filed on Apr. 18, 2002.

(30) Foreign Application Priority Data

Apr. 8, 2002    (EP) .................................. 02100352

(51) Int. Cl.
 B41J 2/355    (2006.01)

(52) U.S. Cl. ........................................................ 347/15
(58) Field of Classification Search .................. 347/15;
358/1.2, 1.9, 3.01, 502, 515
See application file for complete search history.

(56) References Cited

U.S. PATENT DOCUMENTS

| 6,027,196 | A | 2/2000 | Gotoh |
| 6,172,692 | B1 | 1/2001 | Huang |
| 2002/0039104 | A1 | 4/2002 | Sato et al. |
| 2006/0187252 | A1* | 8/2006 | Deer et al. .................... 347/15 |

FOREIGN PATENT DOCUMENTS

| EP | 0820189 | 1/1998 |
| EP | 1083739 | 3/2001 |
| EP | 1146726 | 10/2001 |

* cited by examiner

*Primary Examiner*—K. Feggins
(74) *Attorney, Agent, or Firm*—Robert A. Sabourin

(57) ABSTRACT

A method is used for constructing a look up table for characterizing a printing device, and a system therefore, wherein the look up table is an inverse look up table for obtaining for the printing device colorant values in a colorant space as a function of given color values in a color space. The method includes: (a) selecting an axis in the color space; (b) selecting a path in the color space; (c) determining a particular point on the path having a predetermined colorant value; (d) projecting the particular point on the axis, thus obtaining a projected point; and (e) adding the projected point to the look up table as a sampling point.

14 Claims, 3 Drawing Sheets

SYSTEM AND METHOD FOR CHARACTERIZING A PRINTING DEVICE

This application is a national stage filing under 35 USC §371 of PCT application no. PCT/EP03/50090 filed Apr. 4, 2003 which claims priority to EP application no. 02100352.0 filed Apr. 8, 2002, and U.S. provisional patent application No. 60/373,526 filed Apr. 18, 2002.

FIELD OF THE INVENTION

The present invention relates to the field of image rendering by means of printing devices, particularly multicolor output devices; the invention especially concerns characterization of these devices.

BACKGROUND OF THE INVENTION AND DEFINITION OF TERMS

Today, more and more printing systems are developed for the reproduction of color images. Several printing technologies are used such as conventional photography, electrophotography, thermal transfer, dye sublimation and ink jet systems to name a few.

All these systems can be described as multidimensional color printers with n colorants, such as the CMYK (cyan, magenta, yellow and black) inks of an ink jet system. In this document it is assumed that the colorant values range from 0% (no colorant laid down on the receiving substrate such as paper) to 100% (maximum amount of colorant laid down on the receiving substrate).

With colorant space is meant an n-dimensional space with n the number of independent variables with which the printer can be addressed. In the case of an offset printing press the dimension of the space corresponds to the number of inks of the printer. When CMYK inks are used, the dimension of the colorant space is normally four.

The colorant gamut is defined by the possible combinations of the colorant values, normally ranging from 0% to 100%. If there are no colorant limitations, the colorant gamut is a n-dimensional cube.

With color space is meant a space that represents a number of quantities of an object that characterize its color. In most practical situations, colors will be represented in a 3-dimensional space such as the CIE XYZ space. However, also other characteristics can be used such as multi-spectral values based on filters that are not necessarily based on a linear transformation of the color matching functions to represent color.

A printer model is a mathematical relation that expresses color values as a function of colorants for a given printer. The variables for the colorants are denoted as $c_1, c_2, \ldots, c_n$, with n the dimension of the colorant space. An n-ink process is completely characterized by its colorant gamut with a number of colorant limitations and the printer model. Because of this close relationship between an n-ink process and the printer model, the operations typical for a printer model are also defined for the n-ink process.

The printer model is often based on a printer target. Such a target consists of a number of uniform color patches, defined in the colorant space of the printing device. The printer target is printed and measured, and based on the values of the patches in colorant space and the measured values, the printer model is made. A printer target is normally based on a number of sampling points along the different colorant axes. Based on the sampling points a regular grid can be constructed in colorant space of which a number of grid points are contained by the printer target. Hence a target can be said to be complete or incomplete, see EP-A-1 146 726 herein incorporated by reference in its entirety for background information for complete and incomplete printer targets.

Creating the printer model is also called characterizing the printer; this is an important step in the consistent reproduction of images. Before a printer is characterized, it is first calibrated, i.e. put in a standard state. When the printer model is created, it can be inverted in order to obtain a so-called characterization transformation (or inverse printer model). The characterization transformation transforms given colors from color space (typically CIELAB) to the colorant space of the printing device, whereas the printer model transforms given colorant values in the colorant space of the printer to color values in color space.

The calculation of the correct amounts of colorant for the rendering of color images on a printer is also called the color separation problem. Most of the color separation strategies known in the art comprise the following steps.

In a first step, the relation between the amounts of colorants and the resulting colors on a printer is characterized. This is done by first printing a set of colorant combinations that spans the dynamic range of the printer and measuring the resulting colors. An example of such a set is the ANSI IT8.7/3 reference target.

In a second step this relation is mathematically modeled, to obtain the printer model. The printer model usually consists of some form of an analytical expression that predicts color for a given combination of colorant amounts.

In a third step the printer model is inverted. This is necessary since the color separation problem is involved with finding a set of colorants that renders a given color and not vice versa.

Different types of printer models can be used, ranging from analytical models simulating the printing process, over polynomials approximating the global behavior of the printer, to localized approximations of the printer in the colorant domain.

An important advantage of localized models is that a simple mathematical expression is used to represent the printer behavior. For such an approach, in most cases the colorant cube is divided into cells that are all modeled separately. A disadvantage is that, at boundaries of neighboring cells, the model is not continuous for the first derivative and hence sometimes slope discontinuities in the modeling can be seen.

In characterizing printing devices, in most cases multi-dimensional Look Up Tables (LUT's) are used. A typical example of such a characterization system is represented by the ICC profile format (ICC stands for International Color Consortium). For printers, both the forward and the inverse relation is needed. The forward relation, embodied in the forward LUT, predicts the color values in function of given colorant values, i.e. it represents the printer model. The inverse relation, embodied in the inverse LUT, gives the colorant values required to obtain given color values, i.e. it represents the characterization transformation of the printer.

A LUT is often characterized by a number of sampling points (or sampling values) per axis. Based on these sampling points, usually a regular grid is constructed. However, it is also possible to construct LUT's with non-regular grids. Also in this case the LUT's can be characterized by sampling points per axis but not all combinations of the sampling points of the different axes result in grid points. We refer to previously cited patent application EP-A-1 146 726 for more information on grids, printer models, complete and incomplete printer targets, and related terms, and to patent application EP-A-1 083 739, herein incorporated by reference in its entirety for background information, for more information on calibration, characterization, and other relevant terms.

In known systems, the sampling points of a LUT are chosen at predetermined values, e.g., for sampling points along a colorant axis c, at colorant values c=0%, 25%, 50%, 75% and 100%.

Several printers have, for one or more of the colorants, multi-density inks, i.e. two or more inks that have a different density and a similar hue, e.g. light cyan and heavy cyan. By means of multi-density inks, the apparent visual resolution of the printed images can be increased. Multi-density inks can be used in several ways; however, if the calibration is based on 1-ink processes, the relation between the multi-density inks is fixed. If there is a light and heavy ink for cyan for example, a relation is given that converts a global cyan value to a light and a heavy cyan value. Hence the printer is still considered as a CMYK device, but internally the global ink values can be converted to multi-density ink values. The relation between a global ink value for a particular colorant and the multi-density ink values is given by an ink splitting table, also called ink mixing table.

There is still a need for an improved method for characterizing a printing device.

SUMMARY OF THE INVENTION

The present invention is a method and system for constructing a look up table for characterizing a printing device. Preferred embodiments include implementation by a computer program or a computer readable medium such as, but not limited to, a compact disc, floppy disc, memory card or magnetic tape.

The present invention concerns the selection of sampling points for an inverse look up table for the characterization of a printing device. In a preferred embodiment of the invention, a particular point on a path in color space is determined that has a predetermined colorant value, and a projection of this particular point on an axis in color space is taken as a sampling point of the inverse look up table.

The axis in color space may be L* in CIELAB space.

In one embodiment of the invention, the path in color space coincides with the axis, i.e. the particular point is directly determined on the axis in color space.

In a preferred embodiment, the particular point is determined by means of color separation values of a plurality of points on the path in color space.

An advantage of the invention is that it allows a smooth representation of color changes in the reproduced images.

Further advantages and embodiments of the present invention will become apparent from the following description and drawings.

BRIEF DESCRIPTION OF THE DRAWINGS

The invention is described with reference to the following drawings without the intention to limit the invention thereto, and in which.

DETAILED DESCRIPTION OF THE INVENTION

Figure 1:
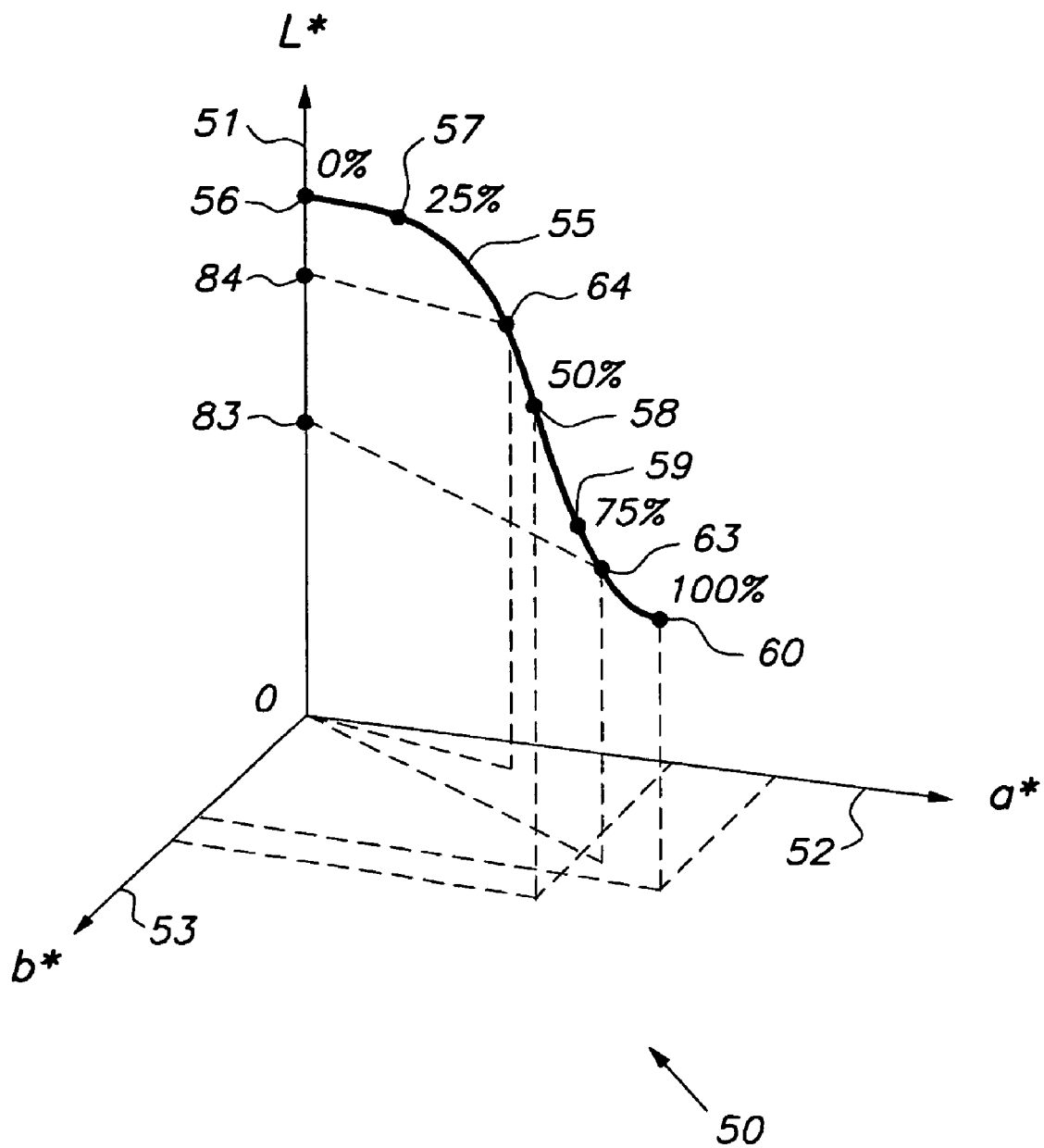
FIG. 1 shows an embodiment of the invention.

FIG. 1 shows a path 55 in a color space 50. In the embodiment of FIG. 1, the color space is CIELAB. Points 56–60 are located on path 55 at respectively coordinates p=0%, 25%, 50%, 75% and 100%. In a particular embodiment, path 55 represents a specific Pantone™ color; in that case, point 57 is the location in CIELAB of the point that corresponds to 25% of this specific Pantone™ color.

Figure 2:
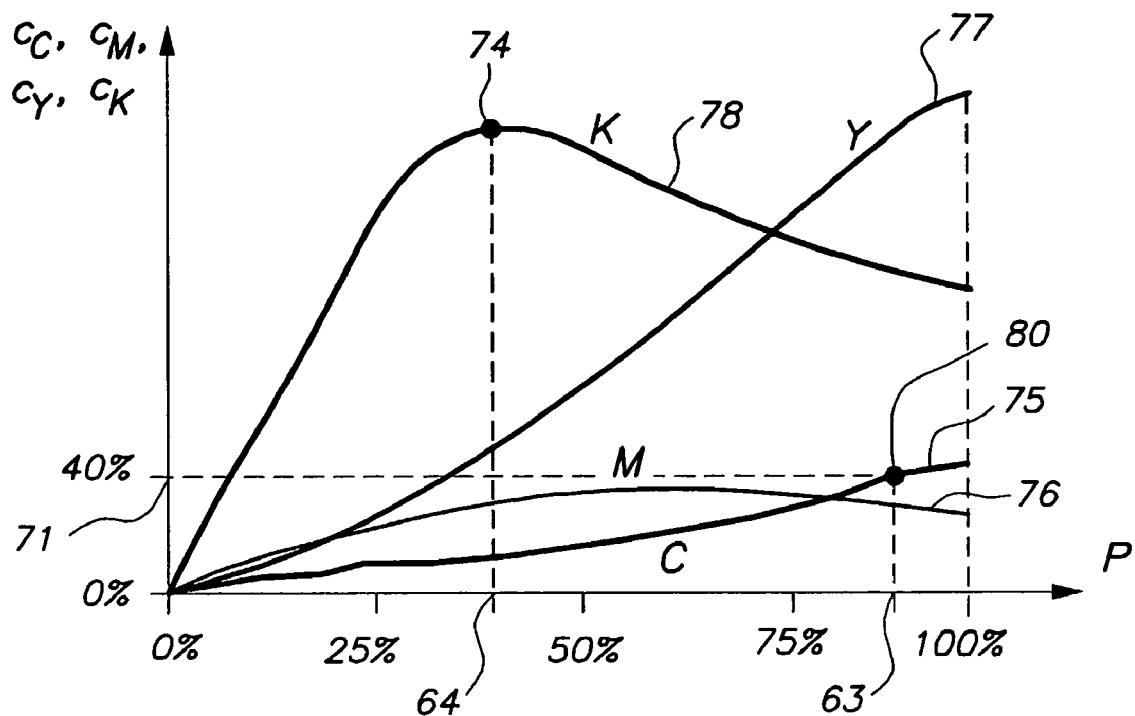
FIG. 2 shows color separation curves for the color values of the path of FIG. 1.

FIG. 2 represents color separation curves 75–78 for path 55. In the shown embodiment, the colorant space is CMYK, and curves 75–78 are the color separation curves in respectively C, M, Y and K. These color separation curves may be determined as follows. For example for point 57, with p=25%, the coordinates in color space 55 are taken and the corresponding colorant values are computed via the inverse printer model. The thus obtained colorant values $c_C$, $c_M$, $c_Y$, $c_K$, for respectively C, M, Y and K, are put in ordinate for the abscissa value p=25%. This is repeated for a number of points along path 55.

Figure 3:
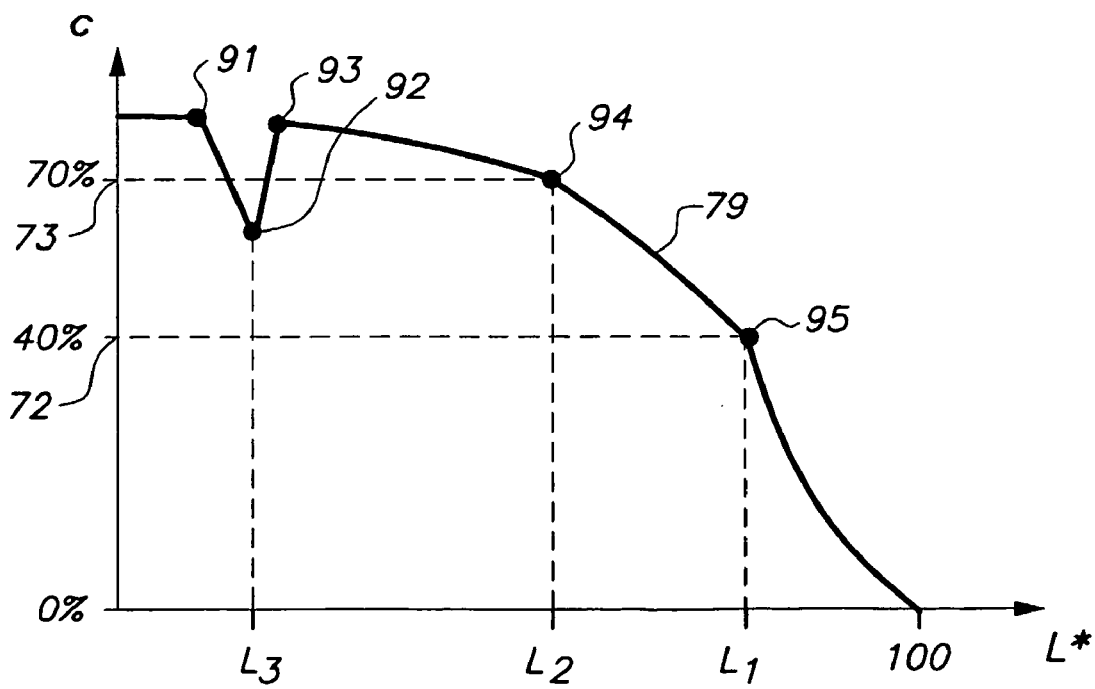
FIG. 3 shows a color separation curve for the L* axis in CIELAB space.

In order to select a sampling point for the inverse look up table for characterizing the printing device, color separation values, as represented by the curves in FIG. 2, may be used as follows. In a first embodiment, a predetermined colorant value is taken, e.g. colorant value 71 in FIG. 2, which is $c_C$=40%. The point on path 55 that has this predetermined colorant value 71 is determined, i.e. point 63, see FIG. 2, by means of color separation curve 75. As shown in FIG. 3, point 63 is then projected on an axis in color space 50, e.g. axis 51 which represents L*, thus obtaining projected point 83. The L*-value of point 83 is taken as a sampling point along the L* axis. In general, such a point 63 having a predetermined colorant value 71 may also be determined without using the color separation curves 75–78; this will be illustrated further below. In a second embodiment, the color separation values (as shown in FIG. 2) are analyzed for at least one colorant. Based on the analysis, a point on path 55 is determined, such as point 64 (see FIG. 2) that corresponds to a local extremum 74 (in this case a local maximum) of separation curve 78 for K. As shown in FIG. 3, this point 64 is again projected on an axis in color space, resulting in projected point 84, which also yields a sampling point along the L* axis.

An advantage of the invention is that points where the printing device has a peculiar behavior can be selected as sampling points, which results in better quality of the reproduced images, such as a smooth representation of color changes. This selection of sampling points is opposed to the prior art, where predetermined sampling points are used.

The effects of the invention can easily be shown for the reproduction of neutral colors, i.e. white, grays and blacks, and this especially for low GCR (Gray Component Replacement) values. Low GCR means that the gray values are made with almost a minimal amount of black, i.e., for a CMYK printing device, mainly with CMY. If a minimal amount of black is used for reproducing gray values, the gray values are reproduced in a very unstable way. This means that a small change of the colorant values has a maximal effect on the required color. If however, a maximal amount of black is used (high GCR), the grays are reproduced in a very stable way. This effect can be easily seen as changes in the CMY values often induce a small color shift of the neutrals and this shift changes in most cases smoothly from a dark gray to a light gray. Errors in the neutral colors are easily noticed as the human visual system is very sensitive for neutrals. Moreover, the neutral colors are difficult to reproduce. Therefore, sampling points along a path corresponding to a neutral color, e.g. sampling points along the L* axis in CIELAB space, are very important. In CIELAB space, colors for which a* and b* are zero are considered to be neutral. For neutrals, the lightness component L* varies from 0 to 100, wherein 0 corresponds to black and 100 to pure white. In CIELAB, it is thus important to choose a proper sampling along the lightness axis.

This importance is emphasized by the embodiment of FIG. 1, wherein points 63 and 64 are projected onto the L* axis. Moreover, in a specific embodiment of the invention, the path 55 in color space 50 on which a particular point 63, 64 is determined, and the axis 51 on which the particular point 63, 64 is projected, coincide with each other. In other words, the particular point 63, 64 is then determined directly onto the axis in color space. In CIELAB space, this axis is preferably the L* axis.

If the sampling points are directly determined onto the L* axis, this allows accurate rendering of a color vignette (showing gradual color changes) for neutrals. In case the sampling points are determined by the intermediate of a path 55 representing a specific Pantone™ color, as discussed above with reference to FIG. 1, this allows accurate rendering of a color vignette of this specific Pantone™ color.

FIG. 3 shows a color separation curve 79 for the L* axis in CIELAB space. Curve 79 gives the relation between a single colorant value, c, in ordinate, and L* in abscissa. If the colorant space is CMYK, then c is either $c_C$, $c_M$, $c_Y$ or $c_K$. As mentioned before, it is advantageous to select points where the printing device has a peculiar behavior as sampling points. For the separation curve 79 of neutrals, shown in FIG. 3, such points are points 91–95. The L* values corresponding to these points, such as $L^*=L_1$ for point 95, are then taken as sampling values along the L* axis. As mentioned already above, the sampling points may be determined in two different ways. In the first embodiment mentioned above, one starts from a predetermined colorant value, while in the second embodiment, a color separation curve is analyzed and the sampling point results from the analysis. Both embodiments are discussed now with respect to FIG. 3.

Figure 4:
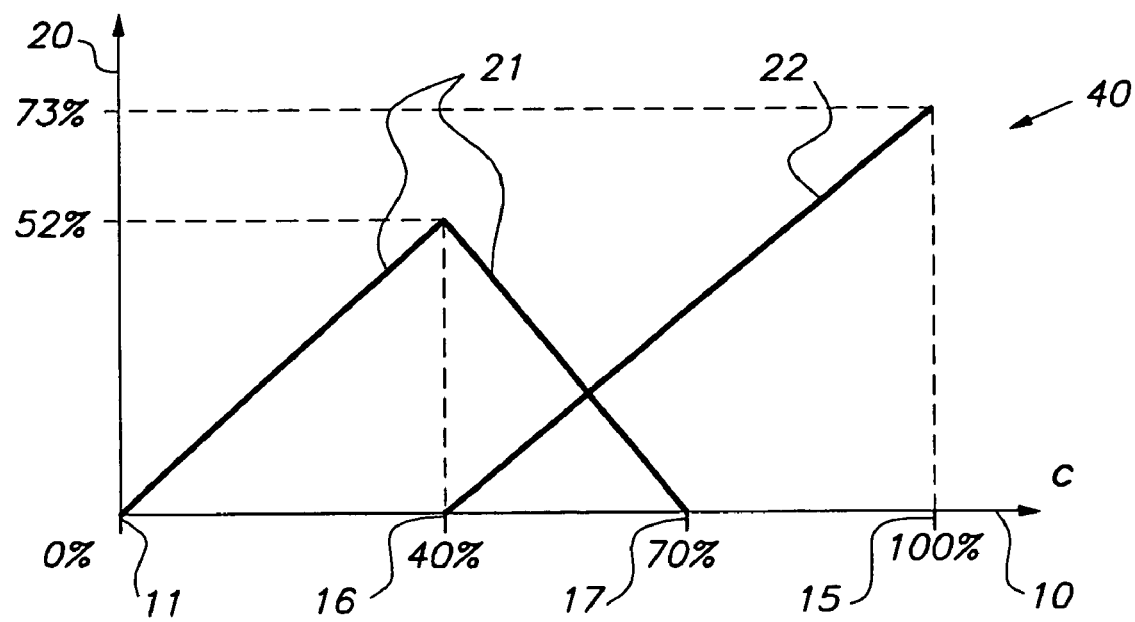
FIG. 4 shows an ink mixing table.

In the first embodiment, a predetermined colorant value 72, 73 is taken, such as c=40% or c=70% in FIG. 3. Such a predetermined colorant value 72, 73 may correspond to a printer model boundary point 94, 95 of the printing device, i.e. a point at a boundary of a cell of a localized printer model, as discussed already above. A predetermined colorant value 72, 73 may also correspond to a point that is called an ink changing point in this document. Ink changing points occur in case of a printing device with multi-density inks, at values for which a multi-density ink changes non-smoothly. Ink changing points are discussed further below, with reference to FIG. 4. In FIG. 4, c=40% and c=70% are ink changing points. Returning to FIG. 3, the L* values of points 94 and 95, i.e. $L^*=L_1$ and $L^*=L_2$, are taken as sampling values along the L* axis. An advantage of taking ink changing points and printer model boundary points as sampling points is that the printer behavior at such points is often non-smooth. For printer model boundary points, it was already discussed above that at such points sometimes slope discontinuities in the modeling can be seen. The non-smooth behavior at ink changing points is now discussed with reference to FIGS. 4 and 5.

As mentioned already above, if a printing device has multi-density inks for at least one of its colorants, and the calibration is based on 1-ink processes, customarily an ink splitting table (or ink mixing table) is used. Such an ink splitting table gives the relation between a global ink value for the colorant for which multi-density inks are used and the multi-density ink values.

FIG. 4 shows an ink mixing table 40 for a light and a heavy multi-density ink of a particular colorant (e.g. cyan). FIG. 4 gives the amount of light ink, curve 21, and the amount of heavy ink, curve 22, as a function of the global colorant value c for the particular colorant, which is indicated along axis 10. In the embodiment of FIG. 4, the amount of light ink 21 reaches a maximum at a global colorant value of c=40% and then decreases to zero at c=70%. The amount of heavy ink 22 on the other hand increases from zero, at c=40%, up to a maximum reached at c=100%. The amounts of light and heavy ink are given by the ordinate values of curves 21 and 22, i.e. by the values along axis 20. In FIG. 4, the maximum amount for the light ink is 52% and that for the heavy ink 73%. As is the case in the embodiment depicted in FIG. 4, the maximum amounts do not have to be 100% but can be lower, in order to reproduce colors with less ink.

Figure 5:
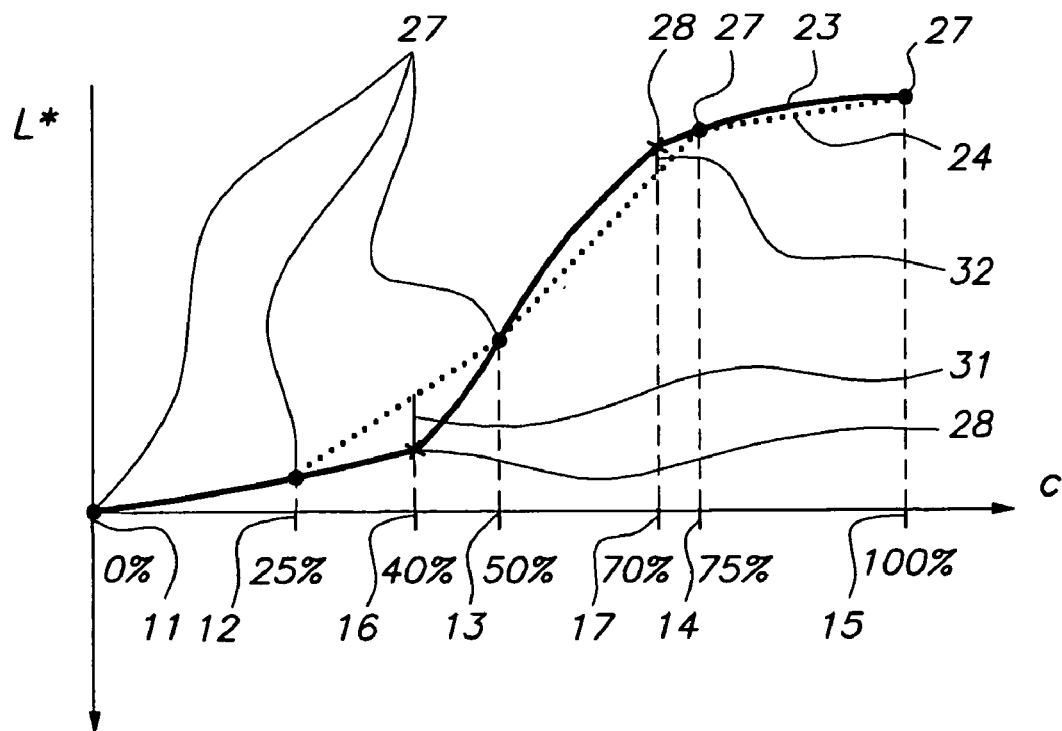
FIG. 5 represents a graph of CIE lightness L* for the ink mixing table of FIG. 4.

The behavior of the ink mixing table of FIG. 4 is not smooth at c=40% and c=70%. This behavior in most cases induces a non-smooth change in the color values. In FIG. 5 one of the color values, CIE lightness L*, is represented for the mixing of the inks represented in FIG. 5. FIG. 5 indeed shows a non-smooth change of lightness L* for c=40% and c=70%, as indicated by the solid curve 23 (remark: in FIG. 5, point c=0% of curve 23 has a high value of L*, e.g. L*=100 if L* is determined with respect to the so-called 'white of the paper', while point c=100% of curve 23 has a low value of L*, e.g. L*=40). If the forward look up table of the printing device contains the sampling points 16 and 17 at c=40% and c=70%, the coordinates of the points 28 are known and hence the printer model can predict this non-smooth behavior. If however the forward look up table does not contain these sampling points 16, 17, but for example only the sampling points 11–15 at respectively c=0%, 25%, 50%, 75% and 100%, only the coordinates of the points 27 are known. There is thus no information available of the color behavior at c=40% and 70%, and hence the model will not be able to predict the non-smooth effects at c=40% and 70%. The L* values predicted by a printer model based on sampling points 11–15 is shown in FIG. 5 by the dotted curve 24. The errors made at c=40% and 70% are quite serious; they are indicated by the line segments 31 and 32, which are the differences between the ordinate values of the solid curve 23 and the dotted curve 24.

As is clear from the explanation above, to model the printer properly in case of multi-density inks and the use of ink mixing tables, it is advantageous to include the values for which a multi-density ink changes non-smoothly. The points that correspond to these values are called ink changing points in this document. Typical ink changing points correspond to values at which an additional ink starts (in FIG. 4: c=40% for curve 22 of the heavy ink), at which an ink reaches a maximum (c=40% for curve 21 of the light ink), becomes constant, or zero (c=70% for curve 21 of the light ink). Mathematically speaking, at an ink changing point the derivative of the ink mixing table is not continuous and hence the ink mixing table has a non-smooth behavior at the ink changing point.

The above discussion with respect to FIG. 5 is related to a forward LUT. However, also for the inverse LUT it is advantageous to include one or more, and preferably all ink changing points as sampling points. Using such an inverse LUT results in smaller errors and better color reproduction.

In FIG. 3, points 94 and 95 may be determined by starting from a predetermined colorant value, namely colorant value 73 respectively 72, and by using color separation curve 79. However, points 94 and 95 may also be determined without using a separation curve, e.g. by means of an iterative process. Suppose that the colorant space is CMYK and the color space is CIELAB. A predetermined colorant value 72 is given, e.g. $c_C$=40% (see also FIG. 3). Moreover, a GCR value is given. Now, iteratively, by using the printer model, the point on the L* axis is determined that has these values. By means of an iterative search strategy, the colorant values CM for M and cY for Y are varied until point 95 is determined, i.e. the result of the iterative process will be $L^*=L_1$ and $a^*=b^*=0$.

In the second embodiment discussed already above, a color separation curve is analyzed, or, which amounts to the same thing, color separation values for a plurality of points on a path in color space are analyzed, and a sampling point results from the analysis. This embodiment is discussed now with respect to FIG. 3.

FIG. 3 shows that the separation curve 79 of neutrals has a peculiar behavior at points 91–95. These points 91–95 can be found by analyzing curve 79. Points 91–95 are slope discontinuities, i.e. points where the slope of curve 79, or in other words the first derivative of the curve, is not continuous. Point 92 is also a local extremum, in this case a local minimum. As mentioned already above, a slope discontinuity may be an ink changing point or a printer model boundary point. A slope discontinuity may also originate from other sources, such as: a non-well behaved CMYK process; a sudden change in the GCR behavior in case of a CMYK printer; a sudden change resulting from an imperfect printer model. Points 91–93 on curve 79 may be caused by a singularity in the CMYK process, where two different curves in CMYK space are mapped onto the same point in CIELAB space. A typical example of an imperfect printer model occurs in the case of a cyan, green, yellow process. Here, the green can be made by combining cyan with yellow, so that there are in some cases multiple solutions to obtain a given color.

Using local extrema, slope discontinuities, or both to determine sampling points is important in order to obtain accurate color rendering, as is clear from the discussion with respect to FIG. 5 above.

Finding a local extremum by analyzing a color separation curve is straightforward and will not be discussed. Finding a slope discontinuity can be done as follows. The color separation curve is calculated for two hundred fifty-six equidistant abscissa values $x_i$ (i=0 to 255 with a step of 1, denoted as i=0(1)255, i.e. i=0, 1, 2, ... 255), wherein the first value $x_0$ of these equidistant values corresponds to the first point of the color separation curve, and the last value $x_{255}$ corresponds to the last point of the color separation curve (for example, in FIG. 3, if the first point of curve 79 would have a value L*=30, and the last point has, as indicated, a value L*=100, then $x_0$=30, $x_{255}$=100, and the distance between $x_i$ and $x_{i+1}$ is 0.27=(100−30)/(256−1)). For an abscissa value $x_i$, the calculated value is the ordinate value $y_i$, so that the curve is now given by two hundred fifty-six points $(x_i, y_i)$. The vector between two consecutive points $(x_{i−1}, y_{i−1})$ and $(x_i, y_i)$ is denoted as $[(x_{i−1}, y_{i−1}) \rightarrow (x_i, y_i)]$. The angle $theta_i$ is calculated between two consecutive vectors $[(x_{i−1}, y_{i−1}) \rightarrow (x_i, y_i)]$ and $[(x_i, y_i) \rightarrow (x_{i+1}, y_{i+1})]$ for i=1(1)254. $Theta_i$ is defined as the angle between the extension of vector $[(x_{i−1}, y_{i−1}) \rightarrow (x_i, y_i)]$ (which is the line segment starting in $(x_i, y_i)$ and having the direction of $[(x_{i−1}, y_{i−1}) \rightarrow (x_i, y_i)]$) and vector $[(x_i, y_i) \rightarrow (x_{i+1}, y_{i+1})]$; $theta_i$ is positive in counter-clockwise direction and is in the range from −180° to 180°. A slope discontinuity is now defined as a point $(x_i, y_i)$ where the absolute value of $theta_i$ is larger than 10°.

In case of a plurality of color separation curves, e.g. four color separation curves for respectively C, M, Y and K, it is preferred that each of these curves is analyzed. The sampling points resulting from each analysis are then put together to form a set of sampling points (along a path or axis, such as the L* axis). Moreover, additional sampling points may be added to this set, e.g. by each time halving the largest interval between two succeeding sampling points. In this way, a predetermined number of sampling points may be obtained.

In FIG. 1, points 63 and 64 are projected onto the L* axis, axis 51. Points 63 and 64 may also be projected on another axis in color space 50, e.g. on the a* axis, axis 52, or on the b* axis, axis 53, or on both. In this way, sampling points along these other axes (e.g. along the a* and the b* axis) may be obtained.

An example of points on a curve 55 in color space 50 is the use of a specific Pantone™ color. Another example is related to the use of absolute and relative colorimetric values. Suppose that the color space is CIELAB and that the receiving substrate is not white but yellow paper, with L*=90, a*=0 and b*=5. If the neutral colors are now determined relatively with respect to this yellow paper, their absolute colorimetic values do not coincide with the L* axis but are located on a curve in CIELAB space.

The present invention is concerned with selecting one or more sampling points for an inverse look up table for characterizing a printing device. A sampling point may be an ink changing point or another point, as discussed above. In one embodiment of the present invention, a path 55 and an axis 51 in a color space 50 are selected. The path and the axis may coincide; moreover, they may coincide with the L* axis in CIELAB space.

The invention was discussed especially with respect to CMYK ink jet printers, but the present invention is not limited to the embodiments discussed above. The invention is also applicable to printing devices using other printing technologies, such as electrophotography, thermal transfer, dye sublimation. Other colors than CMYK may be applied; the printer may have more, or less, than four colorants.

Having described in detail preferred embodiments of the current invention, it will now be apparent to those skilled in the art that numerous modifications can be made therein without departing from the scope of the invention as defined in the appending claims.

LIST OF REFERENCE SIGNS

10: colorant axis
11–17: sampling point
16: ink changing point
17: ink changing point
20: ink amount
21–24: curve
27: point
28: point
31: error
32: error
40: ink mixing table
50: color space 51–53: axis
55: path
56–60: point on path
63,64: point
71–73 colorant value
74: local extremum
75–79: color separation curve
80: ink changing point
83,84: projected point
91–95: slope discontinuity
92: local extremum
94,95: ink changing point

The invention claimed is:

1. A method for constructing a look up table for characterizing a printing device, wherein said look up table is an inverse look up table for obtaining for said printing device colorant values in a colorant space as a function of given color values in a color space, the method comprising the steps of:
   selecting an axis in said color space;
   selecting a path in said color space;
   determining a particular point on said path having a predetermined colorant value;
   projecting said particular point on said axis, thus obtaining a projected point; and
   adding said projected point to said look up table as a sampling point.

2. The method according to claim 1 further comprising the steps of:
   determining color separation values in said colorant space for a plurality of points on said path; and
   using said color separation values in determining said particular point on said path.

3. The method according to claim 1 wherein said predetermined colorant value is selected from a group consisting of a colorant value of an ink changing point of said printing device and a colorant value of a printer model boundary point of said printing device.

4. The method according to claim 3 further comprising the step of:
   adding all ink changing points of said printing device to said look up table as sampling points.

5. The method according to claim 1 wherein said path corresponds to a neutral color in said color space.

6. The method according to claim 1 wherein said color space is CIELAB and said axis is CIE L*.

7. The method according to claim 1 wherein said path coincides with said axis.

8. The method according to claim 7 wherein a second axis is selected from a group consisting of CIE a* and CIE b*.

9. The method according to claim 1 further comprising the steps of:
   projecting said particular point on a second axis, thus obtaining a second projected point; and
   adding said second projected point to said look up table as another sampling point.

10. The method according to claim 1 wherein said printing device is an ink jet printer.

11. A system for constructing a look up table for characterizing a printing device, wherein said look up table is an inverse look up table for obtaining for said printing device colorant values in a colorant space as a function of given color values in a color space, the system comprising:
   means for selecting an axis in said color space;
   means for selecting a path in said color space;
   means for determining a particular point on said path having a predetermined colorant value;
   means for projecting said particular point on said axis, thus obtaining a projected point; and
   means for adding said projected point to said look up table as a sampling point.

12. The system according to claim 11 further comprising said printing device.

13. A computer-readable medium encoded with a computer program for constructing a look up table for characterizing a printing device, wherein said look up table is an inverse look up table obtaining for said printing device colorant values in a colorant space as a function of given color values in a color space, the computer-readable medium encoded for performing the method of:
   selecting an axis in said color space;
   selecting a path in said color space;
   determining a particular point on said path having a predetermined colorant value;
   projecting said particular point on said axis, thus obtaining a projected point; and
   adding said projected point to said look up table as a sampling point.

14. A computer readable medium comprising computer executable instruction for constructing a look up table for characterizing a printing device, wherein said look up table is an inverse look up table for obtaining said printing device colorant values in a colorant space as a function of given color values in a color space to carry out the method steps of:
   selecting an axis in said color space;
   selecting a path in said color space;
   determining a particular point on said path having a predetermined colorant value;
   projecting said particular point on said axis, thus obtaining a projected point; and
   adding said projected point to said look up table as a sampling point.

* * * * *